Figure 1:
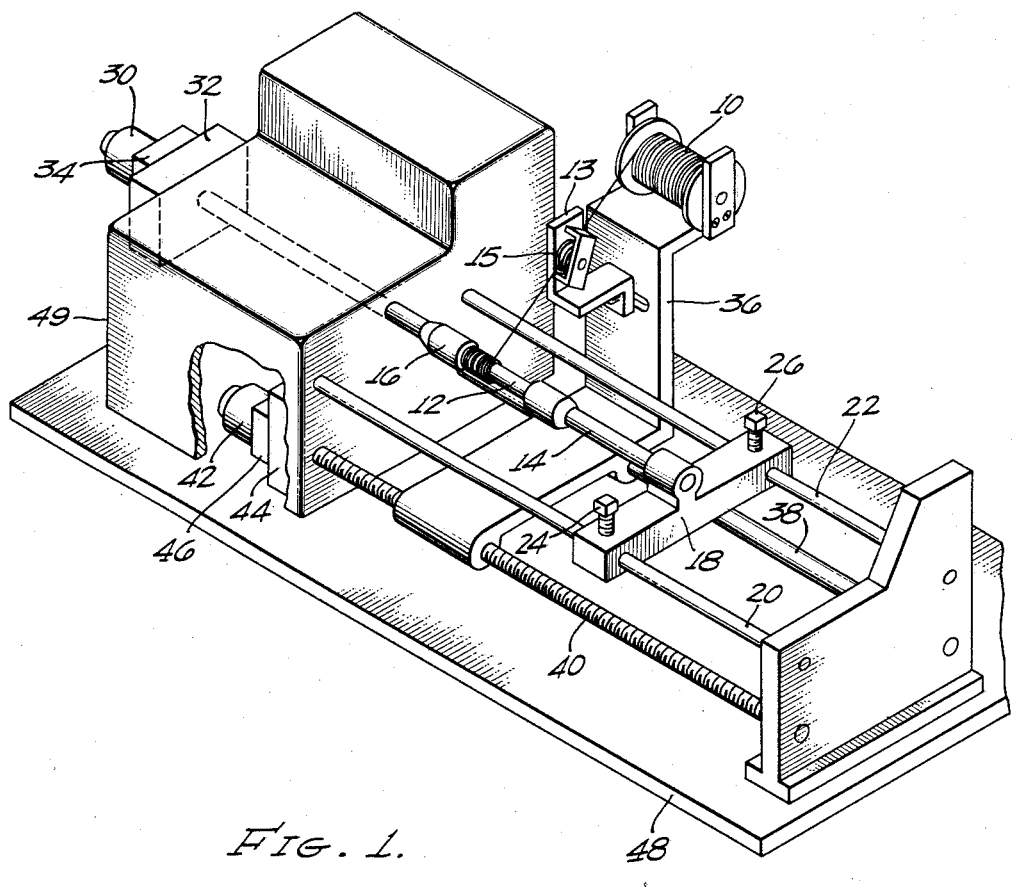

Dec. 13, 1960 J. ROSENBERG 2,964,252
CONTROL SYSTEM
Filed Jan. 24, 1957 2 Sheets-Sheet 1

INVENTOR.
JACK ROSENBERG.
BY
J. L. Bowes
ATTORNEY

United States Patent Office 2,964,252
Patented Dec. 13, 1960

2,964,252

CONTROL SYSTEM

Jack Rosenberg, Pacific Palisades, Calif., assignor to General Dynamics Corporation, Rochester, N.Y., a corporation of Delaware Filed Jan. 24, 1957, Ser. No. 636,090

5 Claims. (Cl. 242—9)

This invention relates to electronic control systems for apparatus wherein there occurs an independent motion and a dependent motion which is a function of said independent motion. More particularly, this invention is for an improved system for controlling the dependent motion responsive to the independent motion.

The problem of motion control of the type wherein one motion is a function of a second motion which is an independent variable arises quite often throughout industry. For example, in the coil-winding art, a coil form may be rotated by a spindle at a uniform speed and wire may be fed onto the coil form at a point therealong which is determined as a function of the number of rotations which have been made by the coil form from an origin position. This determines the number of turns per inch which are placed on the coil form. At present, the form on which a coil is to be wound is usually mounted to be rotated by a spindle at a uniform rate of speed. Then, the number of turns which are made by this spindle are counted. The information derived from the number of turns is used to move a cam which drives a cam follower. The point of the feed of the wire onto the coil form is determined by moving the spools from which such wire is drawn responsive to the cam follower. Alternatively, the wire feed may be held stationary and the coil form can be moved linearly as it rotates in response to the cam-follower operation. This apparatus can operate successfully and repetitively once the proper cam has been cut. However, the time and care required for making the cam sufficiently accurately, especially in the case of coils, where it is desired to alter the turns per inch along its axis in response to some complex function, renders this procedure a costly and tedious one.

An object of this invention is the provision of a novel control system for apparatus of the type wherein the motion of a portion of said apparatus occurs as a function of the motion of another portion of said apparatus.

Another object of this invention is the provision of a novel electronic control system for a coil-winding machine.

Still another object of the present invention is the provision of a useful, simple, and inexpensive coil-winding-machine control system.

Yet another object of the present invention is the provision of an electronic control system wherein, in response to signals generated as a result of one motion, signals are derived for controlling and commanding a second motion in accordance with the predetermined relationship between said first and second motion.

The above and other objects of the present invention are achieved in a control system wherein signals in the form of pulses are derived in response to the occurrence of increments of the independent motion. These pulses are counted and second pulses are derived from the count of the counter in accordance with the predetermined relationship between said independent motion and dependent motion. Means are provided for generating pulses in response to the occurrence of increments of said dependent motion. A further means is provided for subtracting the third pulses derived from said dependent motion from the second pulses derived from the counter. The difference is employed to command said dependent motion.

In the embodiment of the invention using these principles the rotation of a coil form is the independent motion and the position of the wire feed is the dependent motion which is commanded in response to the output from a reversible counter which subtracts dependent motion pulses from the counter output.

Figure 2:
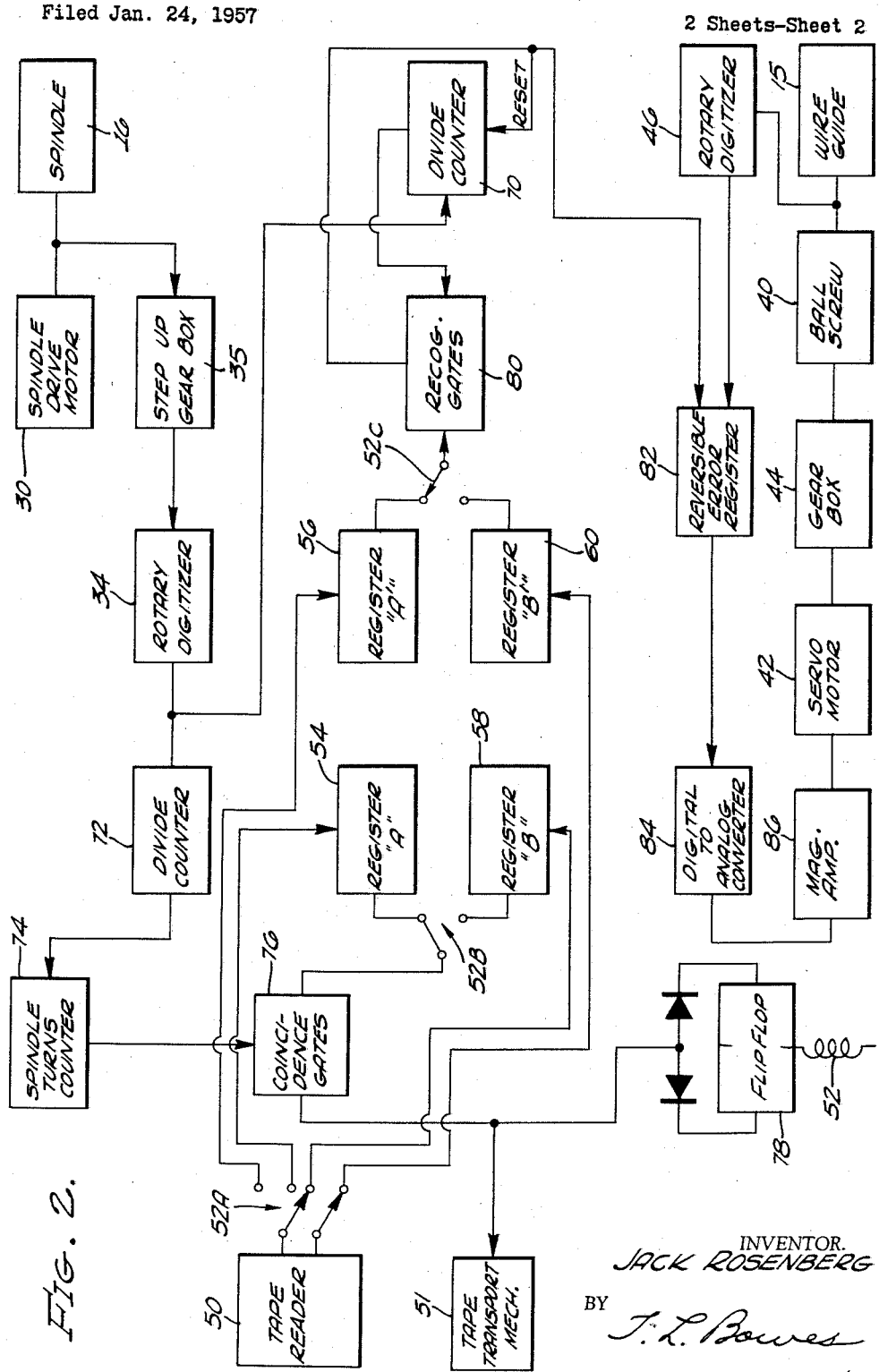

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 shows an isometric view of a mechanical arrangement suitable for embodying the principles of this invention; and Figure 2 is a block diagram of the electronic control system embodying this invention.

Reference is now made to Figure 1, which shows an isometric view of the mechanical arrangement for coil-winding apparatus illustrative of this invention. Effectively, what is shown in Figure 1 is a coil winder modified in accordance with the requirements of this invention. Many of the well-known details of the coil winder have been omitted, in order to preserve the simplicity in the drawing. What is shown is the disposition of the additional components required in accordance with this invention. Thus, the usual wire-tensioning and wire-guiding apparatus between the wire spool 10 and the coil form 12, upon which such wire is wound, is represented by a bracket 13 and pulley 15 from which the wire from the spool is wound onto the coil form 12. The coil form is held between a fixed spindle 14 and a driven spindle 16. The position of the fixed spindle may be altered by means of the sliding carriage 18, which slides upon the two parallel rods 20, 22, and, when a suitable clamping position is found, the bolts 24, 26 are tightened upon the sliding rods 20, 22.

The rotating spindle 16 is driven by means of a motor 30, which drives the spindle through a gear box 32. Also employed is a motion transducer 34, the function of which is to generate an electrical pulse for every increment of rotational motion made by the coil form 12. It is coupled to be driven through a precision gear box which is driven from the spindle. This gear box 35 is included in the transducer box 34. Establishment of the point at which wire is fed onto the coil form is controlled by means of adjusting the position of the slide carriage 36, which supports the wire spool 10 and the wire guide pulley 15. This carriage is supported on two rods, one of which 38 is a slide rod and the second of which 40 is a precision-threaded screw. Rotation of this precision-threaded screw 40 establishes the point of wire feed along the coil form. This precision-threaded screw 40 is driven from a motor 42 through a gear box 44. A second motion transducer 46 similar to the first motion transducer 34 generates pulses for each increment of linear motion of the carriage 36, which, in turn, is directly related to each increment of motion of the screw thread 40. The transducer 46 can therefore be driven also from the gear box 44, and thus generate pulses representative of increments of motion of the wire being wound on the coil form 12. The entire apparatus is mounted on a base 48. The housing 49 supports the usual apparatus for coupling a turns indicator, not shown here, to the spindle shaft.

In operating this apparatus, the coil form is rotated at a constant speed. Therefore, in order to vary the number of turns of wire per inch, all that is required is to move the point at which wire is loaded onto the coil form along the axis of the coil a certain amount for each amount of rotation of the coil form. The motion transducer 34 generates pulses for each increment of rotational motion of the coil form, and the motion transducer 46 generates a pulse for each increment of linear motion of the loading point for the wire on the coil form. Thus, control of the number of turns per inch of wire may be obtained by deriving a number of pulses from those generated by the transducer 34, which, when applied to control the motor 42, provide the required linear displacement of the loading point of the wire along the coil form.

The information for performing these operations is calculated in advance; namely, how many turns of the coil form from a starting position will occur for what axial motion of the point of loading the wire. In this embodiment of the invention, such information is recorded on a storage medium such as magnetic tape, or perforated tape, in the form of a series of two numbers. A first number indicates how many pulses must be obtained from the transducer 34 in response to rotational motion of the coil form from which a pulse may be derived to control the linear motion of the point of wire loading along the coil form. Expressed otherwise, this represents the number of rotational increments of the coil form for a single linear motion increment along the coil form. A second number associated with the first number establishes the number of turns of the coil form which must occur before the next first number may be obtained. In other words, for coils for which it is desired that the number of turns per inch do not vary uniformly across the entire length of the coil, or possibly with the different layers of wire on the coil form, the second number provides information as to the number of turns which are to occur and in conjunction with the first number defines the axial distance along the coil form wherein uniform turns per inch are to occur for that number of turns.

The information consisting of a succession of first and second numbers is recorded on tape or a magnetic medium by well-known means. Referring now to Figure 2, it will be shown how this information is employed for controlling the winding of a coil. The information is read from the tape by a tape reader 50. This information consists of two numbers at a time, one of which is a first number and the other of which is the second number. Initially, the output of the tape reader is connected through double-pole, double-throw relay contacts 52A, which are operated responsive to operation of relay coil 52, to be entered into registers A and A', respectively, 54, 56. The first number is entered into register A' and the second number is entered into register A. Relay 52 is then operated so that the contacts 52A connect to registers B and B', respectively, 58 and 60. The tape transport mechanism 51 is actuated so that reader 50 reads the second of the first and second numbers respectively into registers B' and B. The apparatus is then loaded and ready to commence operation.

The coil form which is driven by the spindle 16 is set at a beginning position, and also the wire loading apparatus is set at a beginning position, or origin point. The motor 30 is then started. As the spindle rotates, driven by the motor or spindle drive 30, the step-up gear box 35, which is driven from the spindle, drives the rotary digitizer 34. As previously described, this generates pulses in response to the motion increments of the spindle and coil form. The purpose of the step-up gear box is to increase the number of pulses derived as the result of the increments of rotary motion. The reason for this is that in this way better and more sensitive control may be derived from the rotary digitizer output. If the rotary digitizer 34 produces a sufficient number of pulses per increment of spindle rotation, then, of course, the step-up gear box 35 may be omitted. The output of the rotary digitizer 34 is applied to a first and second divide counter 70, 72. The divide counter 72 functions in well-known manner to count the output of the rotary digitizer and, when it is filled, emits an output pulse indicative thereof and begins counting again. In this manner, the divide counter 72 counteracts to a degree the effects of the step-up gear train. Its output consists of pulses which are counted by a spindle turns counter 74. The number of turns of the spindle, of course, are also the same as the number of turns of the coil form. Therefore, the spindle turns counter also indicates the number of turns that the coil form has made from the origin position.

It was pointed out previously that the second number was loaded into register A to indicate the number of turns of the coil form required to be made before the next instruction is obtained, indicative of the new turns-per-inch information required. The number in the spindle turns counter and the number in register A 54 are both sensed by coincidence gates 76. These coincidence gates emit an output whenever the two numbers applied to their inputs are identical.

It is to be noted that a single-pole, double-throw contact 52B serves to alternately connect the coincidence gates between register A and register B. This contact 52B is also operated in response to an operation of the relay coil 52. The output of the coincidence gate is applied to a flip-flop circuit 78, which serves to sequence its operation so that, first, it is set upon the application of one pulse, whereby relay 52 is operated, the succeeding pulse resets the flip-flop, thereby relay 52 is no longer operated. Upon the operation of relay 52, in response to the output from the coincidence gates, contacts 52A and 52B and contacts 52C are all operated to their alternate positions. The tape-drive mechanism 51 is indexed so that the next set of first and second numbers is under the tape reader 50. This set of first and second numbers are respectively read into registers A' and A while register B is connected to the coincidence gates.

Considering now the input of the pulses from the rotary digitizer 34 into the divide counter 70, it will be seen that register A' is connected to a recognition gate 80 through contacts 52C. This same recognition gate is also connected to the output of divide counter 70. When a coincidence of counts occurs between the contents of register A' and the divide counter 70, then recognition gate 80 emits an output pulse which is applied to reset the divide counter 70 to zero-count condition and is also applied to a reversible error register 82. Thus, from the description that has occurred, it should be apparent that the first number in register A' controls the divide counter and its output as long as the spindle turns counter has not counted the number of turns in the register A. As soon as this number of turns has occurred, then the relay 52 is operated and the divide counter 70 is controlled by the contents of register B', while the spindle turns counter continues to count until it reaches the number stored in register B. At that time, the relay 52 is again operated to switch control back to registers A and A'.

The output of the recognition gate, which is applied to the reversible error register, may be termed a command pulse. A second input is applied to the error register 82 from the rotary digitizer 46, which, as will be recalled from the description in Figure 1, provides an output pulse indicative of the linear motion along the coil axis of the point of wire loading. The output of this digitizer may be termed the feedback pulses. The reversible error register 82 will count in one direction in response to the output of the recognition gate 80 and in the opposite direction in response to the output of the rotary digitizer 46. Therefore, its output is the representation of the difference between the command and the error pulses. In other words, this is an indication of any unexecuted commands to move the point of wire loading linearly.

The reversible error register output is applied to a digital-to-analog converter 84, the function of which is to convert the digital output indication to an analog current representative thereof. The output of the digital-to-analog converter is applied to a magnetic amplifier 86, which amplifies this current and applies it to the servomotor 42, which rotates an amount determined by the amplitude of this current. The servomotor output drives the gear box 44 and the screw 40. The screw, as previously described, moves the wire spool slide 36 and is also used to drive the rotary digitizer 46.

The operation of the novel control system should then become apparent from what has been described above. The contents of the registers A and A' and registers B and B' alternately are employed to respectively control or determine when the coincidence gates and recognition gates provide their respective outputs. The recognition gates 80 provide an output whenever the divide counter 70 counts a number of pulses from the rotary digitizer 34 equal to the first number. The counter is then reset to zero and immediately commences counting again as the system continues to drive the coil form. The command pulse derived as a result is employed to move the point of loading the coil form linearly along the axis to secure the proper number of turns per inch required during the interval or number of turns, as indicated by the number in the register A or register B. When this number of turns has been reached, then the coincidence gate 76 emits an output which energizes the tape-advance mechanism to load the succeeding first and second numbers into the register which is now available for filling while control of the system is carried on by the other registers, so that the operation of the system can progress smoothly and without interruption.

It is not necessary for the operation of this invention that the rotating spindle be turned at a uniform speed, although this is preferred, since the transducers generate pulses in response to motion and not to speed. Also, although this invention has been described in connection with coil-winding apparatus wherein the wire guide apparatus is moved linearly and the coil form is not, those skilled in the art can readily apply this invention to those coil-winding machines wherein the coil form moves linearly and the wire guide apparatus remains stationary.

Flip-flops, registers, coincidence gates, or recognition gates and divide counters are all well-known electronic apparatus, as is also the apparatus for tape transport and reading from tape into the registers. All these components may be individually purchased commercially, as well as the rotary digitizers, which are effectively electromechanical transducers.

The principles employed herein are explained in connection with the coil-winding machine. It will be readily understood by those skilled in the art that the control principles exemplified herein are employable for other apparatus wherever it is required to control a first motion in response to or as a function of a second motion. Accordingly, this invention is not to be limited to the embodiment illustrated, but is to be given its broadest interpretation within the terms of the following claims.

I claim:

1. In a coil-winding machine wherein it is desired to control the point of wire feed onto a rotating coil form relative to the rotational displacement of said coil form from a starting position, an improved control system comprising means to generate first pulses responsive to increments of rotational motion of said coil form from said starting position, means to derive second pulses from said means to generate responsive to a desired predetermined relationship between the extent of said coil form rotation and the point of said wire being fed thereonto, means to generate a third pulse responsive to an increment of motion of said point of wire feed, means to establish a numerical difference between said second and third pulses, and means to move said point of wire feed along said coil form from one end responsive to said numerical difference.

2. A control system for a coil-winding machine wherein it is desired to control the point of wire feed onto a rotating coil form at a distance from an origin point on said coil form dependent on the rotational displacement of said coil form from a starting position, said control system including means to successively generate digital signals representative of a first number and a second number, said first number representing the number of motion increments of said point of wire feed along said coil form desired as said coil form rotates a number of rotational increments represented by said second number to provide a desired number of wire turns per inch, means for generating first pulses for each increment of rotational motion of said coil form, counting means for counting said pulses, means for deriving an output pulse from said counting means each time it counts to a first number, means for generating a second pulse for each increment of said point of wire feed motion, means for subtracting said second pulse from said derived output pulse, means for commanding motion of said point of wire feed responsive to output from said means for subtracting, and means responsive to said means for counting reaching a count equal to a second number to energize said means to successively generate digital signals representative of a first number and a second number to provide digital signals representative of a successive first and second number.

3. A control system as recited in claim 2 wherein said means to successively generate digital signals representative of a first number and a second number includes a recording medium on which a plurality of successive first and second numbers are recorded, a first number register, a second number register, and means to read entering digital signals representative of a first and second number from said recording medium respectively into said first and second number registers.

4. A control system as recited in claim 3 wherein said counting means includes a first counter, and a second counter, means for applying said first pulses to both said counters, said means for deriving an output pulse from said counting means each time it counts to a first number includes a first recognition gate, means to couple said first coincidence gate between said first counter and said first number register to produce a second output pulse upon said first counter achieving coincidence, said means responsive to said means for counting reaching a count equal to a second number includes a second coincidence gate, means coupling said second coincidence gate between said second counter and said second number register to provide an output pulse upon coincidence being sensed, and means to apply said output pulse to actuate said recording medium to apply to said means to read the next first and second number recorded.

5. A control system as recited in claim 3 wherein there are two first number and two second number registers, and means for applying the output of said means to read to one of said first and second number registers while the contents of the other of said first and second number registers are being compared with the count of said counting means.

References Cited in the file of this patent

UNITED STATES PATENTS

| | | |
|---|---|---|
| 2,434,854 | Junkins et al. | Jan. 20, 1948 |
| 2,441,155 | King | May 11, 1948 |
| 2,643,068 | Harris | June 23, 1953 |
| 2,721,038 | Pasini | Oct. 18, 1955 |
| 2,725,199 | Bower | Nov. 29, 1955 |
| 2,784,359 | Kamm | Mar. 5, 1957 |